(12) United States Patent
Koike

(10) Patent No.: US 12,485,854 B2
(45) Date of Patent: Dec. 2, 2025

(54) PIVOT JOINT STRUCTURE

(71) Applicant: HONDA MOTOR CO., LTD., Tokyo (JP)

(72) Inventor: Akihiko Koike, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 52 days.

(21) Appl. No.: 18/582,660

(22) Filed: Feb. 21, 2024

(65) Prior Publication Data

US 2024/0317191 A1    Sep. 26, 2024

(30) Foreign Application Priority Data

Mar. 20, 2023    (CN) .......................... 202310270011.0

(51) Int. Cl.
*B60T 7/06*    (2006.01)
*G05G 1/44*    (2008.04)

(52) U.S. Cl.
CPC . *B60T 7/06* (2013.01); *G05G 1/44* (2013.01)

(58) Field of Classification Search
None
See application file for complete search history.

(56) References Cited

U.S. PATENT DOCUMENTS 2,371,171 A *   3/1945  Holtman ................. B60D 1/02
                                                    278/106
11,181,140 B1*  11/2021 Ring ....................... B60T 11/18

FOREIGN PATENT DOCUMENTS

CN    104254813 A  * 12/2014  ............... G05G 1/50
JP       S5759168 U    4/1982

* cited by examiner

*Primary Examiner* — Vicky A Johnson
(74) *Attorney, Agent, or Firm* — CKC & PARTNERS CO., LLC

(57) ABSTRACT

A pivot joint structure includes a first pin hole, a second pin hole, and a pin including a pin body inserted through the first pin hole and the second pin hole. The pin includes a protrusion part extending from an axis center of the pin body in a first direction, the fixation holder includes a planar part where the second pin hole is provided and a wall part rising from the planar part in the axial direction of the pin body, the wall part includes a first slit extending in a second direction and having an opening at one end, and the protrusion part is inserted into the first slit by being rotated toward the first slit about a rotation center at the axis center of the pin body.

7 Claims, 13 Drawing Sheets

FIG. 1
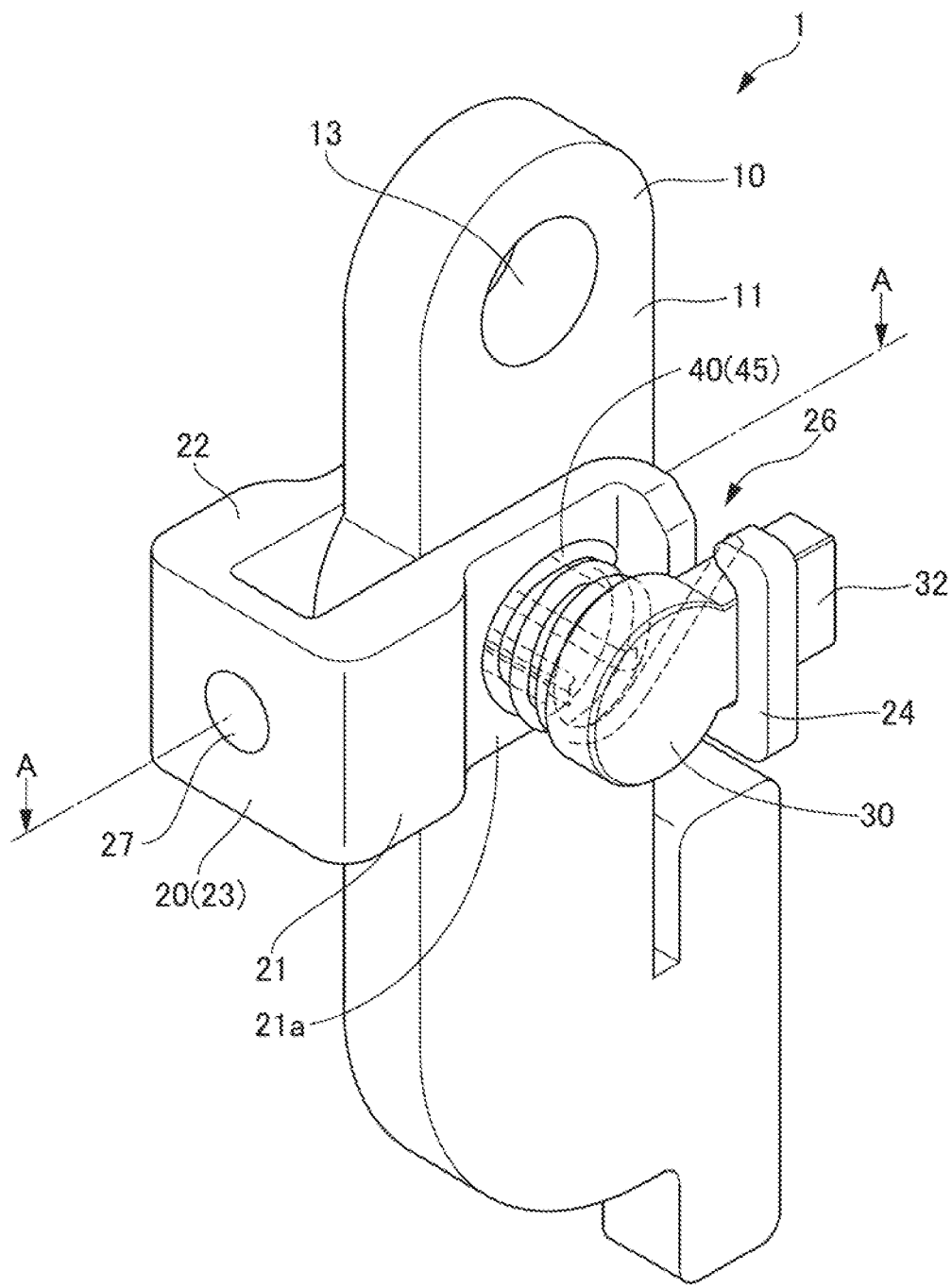
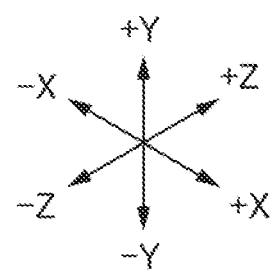

FIG. 2
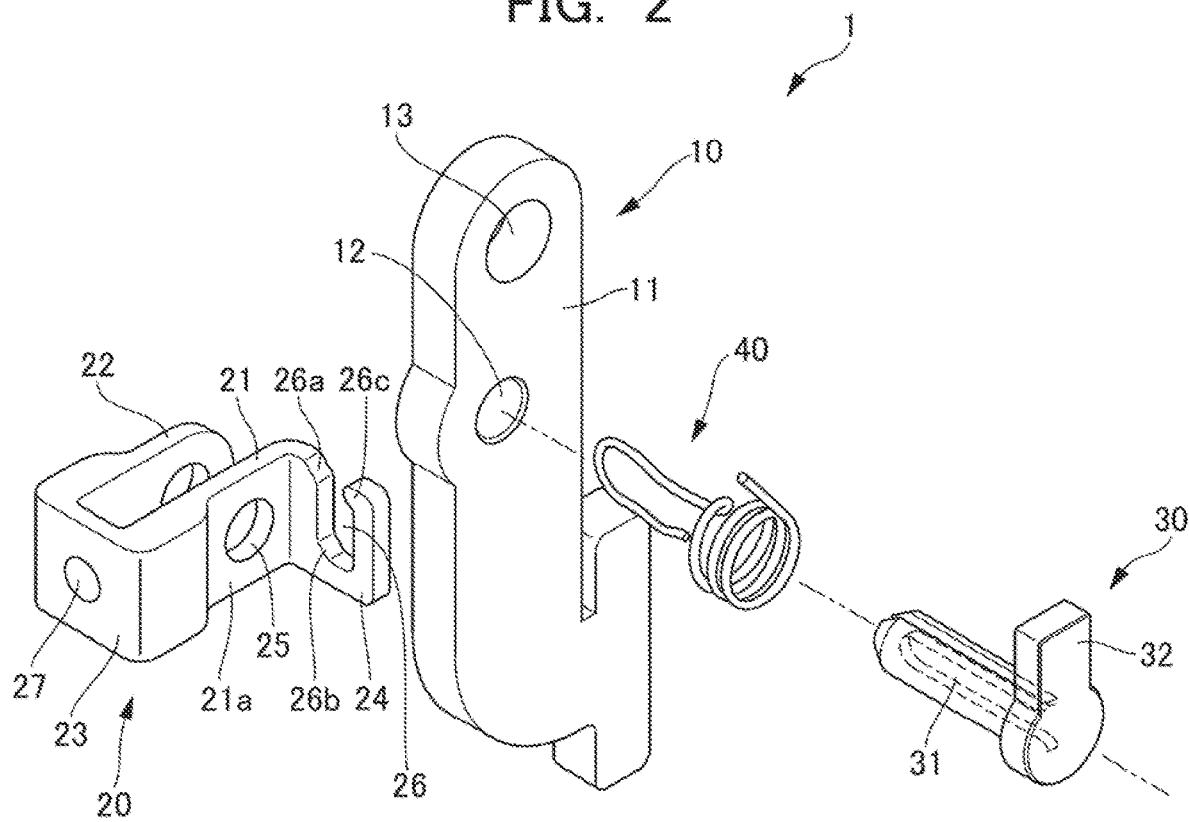
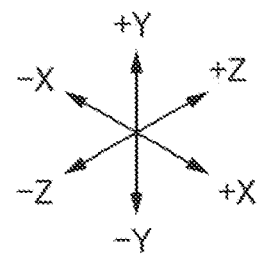

FIG. 6
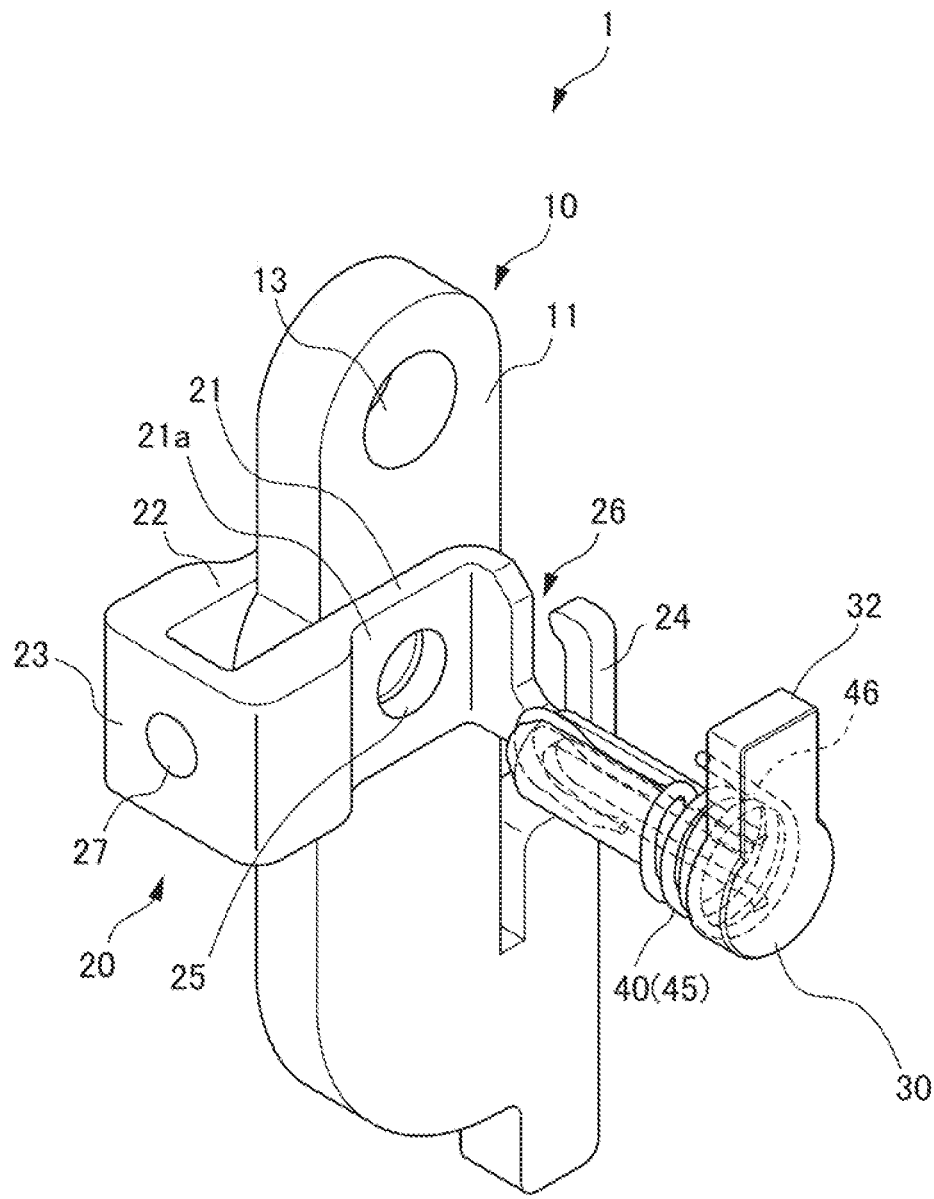
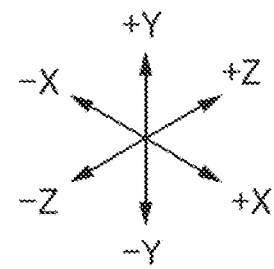

PIVOT JOINT STRUCTURE

This application is based on and claims the benefit of priority from Chinese Patent application No. CN202310270011.0 filed on Mar. 20, 2023, the content of which is incorporated herein by reference.

BACKGROUND OF THE INVENTION

Field of the Invention

The present disclosure relates to a pivot joint structure.

Related Art

In a pedal device such as a brake pedal of an automobile, a joint structure (pivot joint structure) with a clevis pin has been conventionally used (refer to Japanese Utility Model Application, Publication No. S57-059168, for example).

Patent Document 1: Japanese Utility Model Application, Publication No. S57-059168

SUMMARY OF THE INVENTION

However, for example, in a clevis joint such as a coupling part between a brake pedal and a brake actuator, it is necessary to provide clearance at each of two connection parts, namely a connection part between the pedal and a pin and a connection part between the pin and a clevis in order to ensure dimension tolerance and assembly operability. Thus, in a pivot joint structure using a conventional clevis pin, backlash (loss stroke) potentially occurs between an actuation initial point and input start and causes generation of abnormal noise (hammering sound), degradation of actuation efficiency, degradation of actuation feeling, and the like. Furthermore, a step of inserting a further anti-removal split pin or the like into the leading end of the pin is needed to prevent removal of the pin, which requires difficult both-hand work such as insertion of a small component into a small hole, and thus the work has been a load on an assembly worker.

The present disclosure is intended to provide a pivot joint structure that has a simple structure and is easy to assemble and with which backlash from an actuation initial point to actuation start can be reduced.

The present disclosure solves the problem by the following means for solution. It should be noted that the following description includes reference signs corresponding to the components of an embodiment of the present disclosure to facilitate understanding, but the present disclosure is not limited thereto.

A first aspect of the present disclosure is directed to a pivot joint structure (1) that couples a fixation member (10) to a fixation holder (20) pivotally supported on the fixation member (10) by a rotational shaft, the pivot joint structure (1) including: a first pin hole (12) provided through the fixation member (10); a second pin hole (25) provided through the fixation holder (20) at a position corresponding to the first pin hole (12); and a pin (30) including a pin body (31) as the rotational shaft that is inserted through the first pin hole (12) and the second pin hole (25). The pin (30) includes a protrusion part (32) provided at one end of the pin body (31) and extending from an axis center of the pin body (31) in a first direction orthogonal to an axial direction of the pin body (31), the fixation holder (20) includes a planar part (21a) where the second pin hole (25) is provided, and a wall part (24) rising from the planar part (21a) in the axial direction of the pin body (31), the wall part (24) includes a first slit (26) extending in a second direction orthogonal to the axial direction of the pin body (31) and the first direction and having an opening at one end, and the protrusion part (32) is inserted into the first slit (26) by being rotated toward the first slit (26) about a rotation center at the axis center of the pin body (31).

According to a second aspect of the present disclosure, the pivot joint structure (1) as described in the first aspect further includes a spring (40) attached to the pin (30). One end part of the spring (40) and the protrusion part (32) are inserted into the first slit (26), and the first slit (26) has, at the opening, a slit width (W26A) in the axial direction of the pin body (31), and has, at a part closer to a bottom of the first slit (26) than the opening, a slit width (W26B) in the axial direction of the pin body (31), and the slit width (W26A) is smaller than the slit width (W26B).

According to a third aspect of the present disclosure, in the pivot joint structure (1) as described in the first or second aspect, one side of the opening of the first slit (26) in the axial direction of the pin body (31) is provided with a first guide part (26a) that is sloped toward the other side of the opening of the first slit (26) in the axial direction of the pin body (31).

According to a fourth aspect of the present disclosure, in the pivot joint structure (1) as described in any one of the first to third aspects, the bottom of the first slit (26) includes a second guide part (26b) that is sloped and provided on at least one side of the bottom in an axial direction of the pin (30).

According to a fifth aspect of the present disclosure, in the pivot joint structure (1) as described in any one of the first to fourth aspects, the pin (30) includes a second slit (34) extending in the axial direction of the pin body (31), and the pivot joint structure (1) includes a spring (40) disposed along the second slit (34), and the spring (40) includes a first wound part (41) that is wound along the second slit (34) from one end of the pin (30) adjacent to the protrusion part (32) over a leading end part of the pin (30).

According to a sixth aspect of the present disclosure, the pivot joint structure (1) as described in any one of the first to fifth aspects includes a spring (40) attached to the pin (30), the spring (40) includes a second wound part (45) that is wound around an outer periphery of the pin body (31) between the planar part (21a) of the fixation holder (20) and the protrusion part (32) of the pin (30) and that urges the pin (30) toward a side opposite to the fixation member (10) in the axial direction of the pin body (31).

According to a seventh aspect of the present disclosure, the pivot joint structure (1) as described in any one of the first to sixth aspects includes a spring (40) attached to the pin (30), and the spring (40) includes a first curved part (42) that is curved in a direction opposite to the first direction and is able to come into contact with the fixation member (10) in the first pin hole (12) of the fixation member (10), and a second curved part (44) that is curved in the same direction as the first curved part (42) and is able to come into contact with the fixation holder (20) in the second pin hole (25) of the fixation holder (20).

According to an eighth aspect of the present disclosure, the pivot joint structure (1) as described in any one of the first to third aspects is a joint structure that couples a brake pedal to a brake actuator in a vehicle.

According to the present disclosure, it is possible to provide a pivot joint structure that has a simple structure and is easy to assemble and with which backlash from an actuation initial point to actuation start can be reduced.

BRIEF DESCRIPTION OF THE DRAWINGS

FIG. 1 is a diagram illustrating an embodiment of a pivot joint structure 1 according to the present disclosure;

FIG. 2 is an exploded perspective view of the pivot joint structure 1;

FIG. 6 is a perspective view for description of a first work process;

DETAILED DESCRIPTION OF THE INVENTION

Figure 3:
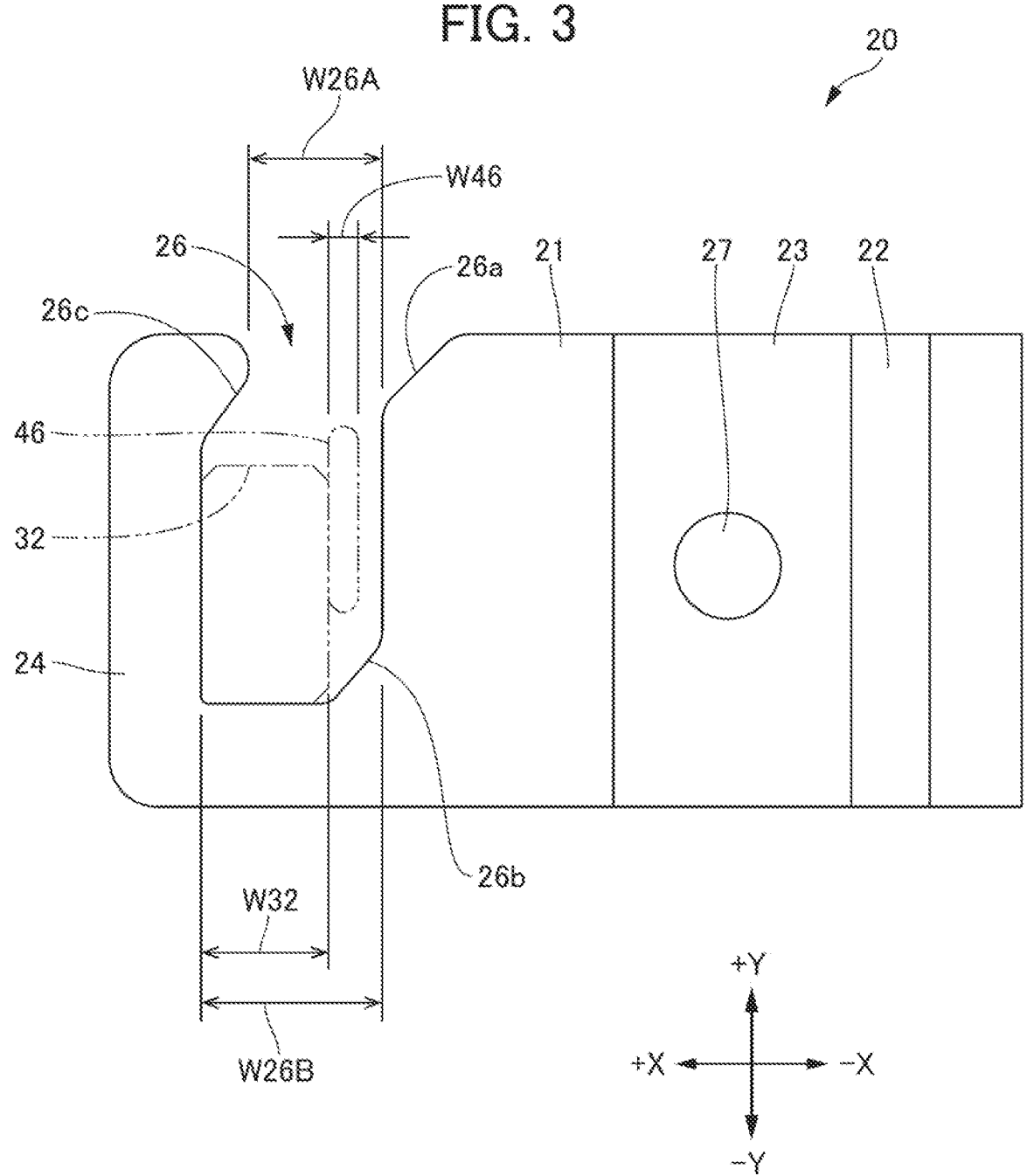
FIG. 3 is a diagram of a fixation holder 20 when viewed from a +Z side.

An embodiment of the present disclosure will be described below with reference to the accompanying drawings and the like.

Embodiment

FIG. 1 is a diagram illustrating an embodiment of a pivot joint structure 1 according to the present disclosure. FIG. 2 is an exploded perspective view of the pivot joint structure 1. Each drawing described below, including FIG. 1 is a schematically illustrated diagram and, the size and shape of each component are exaggerated and omitted as appropriate to facilitate understanding. For convenience of description, X, Y, and Z orthogonal coordinates are provided in the drawings and used in the following description to explain the orientation of each component and the like. Specifically, an X-axis direction is defined to be the axial direction of a pin body 31 of a pin 30, a Z-axis direction is defined to be a direction in which a protrusion part 32 of the pin 30 extends in an assembled state illustrated in FIG. 1, and a Y-axis direction is defined to be a direction orthogonal to the X-axis direction and the Z-axis direction. The Z-axis direction is also referred to as a first direction, and the Y-axis direction is also referred to as a second direction.

The pivot joint structure 1 of the present embodiment includes a fixation member 10, a fixation holder 20, the pin 30, and a spring 40 and is used at, for example, a coupling part between a brake pedal and a brake actuator in an automobile.

The fixation member 10 is a member to which the fixation holder 20 to be described later is attached, and is a component that constitutes part of the brake pedal of an automobile in the present embodiment. The fixation member 10 includes a side surface part 11, a first pin hole 12, and a support hole 13.

The side surface part 11 is formed in a flat plate shape into which the fixation holder 20 can be inserted. The side surface part 11 is a plane parallel to the Y axis and the z axis.

The first pin hole 12 is formed to penetrate in a direction orthogonal to the surface of the side surface part 11. The central axis of the first pin hole 12 extends in a direction parallel to the X axis.

The support hole 13 is a through-hole for attaching the fixation member 10 to a support part (not shown). The fixation member 10 rotates with a pivot at the center of the support hole 13 in accordance with an operation by a driver.

The fixation holder 20 is a member constituting part of the brake actuator and attached to the fixation member 10. The fixation holder 20 includes facing arms 21 and 22, a coupling part 23, a wall part 24, a second pin hole 25, and a first slit 26.

The facing arms 21 and 22 are disposed facing each other, and the fixation member 10 is sandwiched between the facing arms 21 and 22. A planar part 21a that is a plane orthogonal to the axial direction (X-axis direction) of the pin body 31 of the pin 30 to be described later is provided on the +X side of the facing arm 21. The planar part 21a is provided with the second pin hole 25.

The coupling part 23 connects end parts of the facing arms 21 and 22, respectively, on the −Z side, and the facing arms 21 and 22 and the coupling part 23 constitute a substantially U-shaped clevis that is flat at the coupling part 23 as a bottom part. An attachment hole 27 that is used to connect the fixation holder 20 to a body of the brake actuator (not shown) penetrates through the coupling part 23.

The wall part 24 rises in a wall shape (plate shape) from an end part of the facing arm 21 on the +Z side in the axial direction (X-axis direction) of the pin body 31 to be described later, the facing arm 21 including the planar part 21a. The surface of the wall part 24 is a surface parallel to the X and Y axes.

The second pin hole 25 is provided through the planar part 21a of the fixation holder 20 at a position corresponding to the first pin hole 12. The second pin hole 25 penetrates through the facing arms 21 and 22 from the planar part 21a.

FIG. 3 is a diagram of the fixation holder 20 when viewed from the +Z side. The first slit 26 is a bottomed groove (slit) extending in the second direction (Y-axis direction) orthogonal to the axial direction (X-axis direction) of the pin body 31 and the first direction (the X-axis direction), having an opening at one end, and including a bottom part on a side facing the opening. One end part of the spring 40 to be described later and the protrusion part 32 are inserted into the first slit 26. The first slit 26 includes a first guide part 26a, a second guide part 26b, and an overhang part 26c.

The first guide part 26a is a tilt surface provided on one side (the −X side in the X-axis direction) of the opening of the first slit 26 in the axial direction of the pin body 31 and sloped toward the other side (the +X side in the X-axis direction) in the axial direction of the pin body 31. Since the first guide part 26a is provided, the protrusion part 32 and an end part 46 of the spring 40 can be easily inserted into the first slit 26 and assembling easiness can be improved.

The second guide part 26b is a slope provided at the bottom part of the first slit 26 on one side (the −X side in the X-axis direction) in the axial direction of the pin body 31. At assembly work to be described later, in the last process of inserting the protrusion part 32 into the first slit 26 by rotating the pin 30 after inserting the pin 30 in the axial direction, the protrusion part 32 can be reliably pressed against the +X side of the first slit 26 since the second guide part 26b is provided. Accordingly, the end part 46 of the spring 40 can reliably enter between the overhang part 26c and the bottom part of the first slit 26, thereby increasing the effect of preventing removal of the protrusion part 32.

The overhang part 26c is provided on the other side (the +X side in the X-axis direction) of the opening of the first slit 26 in the axial direction of the pin body 31 and protrudes on the −X side. A tilt surface sloped in the same direction as the first guide part 26a is provided on the first slit 26 side of the overhang part 26c. Since the overhang part 26c is provided, removal of the protrusion part 32 can be prevented. Moreover, since the tilt surface is provided at the overhang part 26c, the protrusion part 32 can be moved toward the bottom side (−Y side) of the first slit 26 by urging force of the spring 40 when the protrusion part 32 comes into contact with the tilt surface of the overhang part 26c.

The first slit 26 has, at the opening, a slit width W26A in the axial direction (X-axis direction) of the pin body 31, and has, at a part closer to the bottom of the first slit 26 than the opening, a slit width W26B in the axial direction (X-axis direction) of the pin body 31, and the slit width W26A is smaller than the slit width W26B. With this configuration, when the protrusion part 32 is inserted into the first slit 26 while being rotated at assembly work to be described later, the end part 46 of the spring 40 can enter a gap between the first slit 26 and the protrusion part 32 once the protrusion part 32 reaches a bottom part of a pin holding unit. Thus, after the end part 46 of the spring 40 enters the gap between the first slit 26 and the protrusion part 32, the protrusion part 32 cannot easily get out of the first slit 26, and accordingly, removal of the protrusion part 32 can be prevented.

The slit width W26A is larger than the summed width of a width W32 of the protrusion part 32 in the axial direction (X-axis direction) of the pin body 31 and a width W46 of the end part 46 of the spring 40 in the axial direction (X-axis direction) of the pin body 31. The line diameter of the spring 40 needs to be reduced in some cases to obtain an appropriate value for spring force of the spring 40. In such a case, dimensional accuracy of the slit width W26A potentially needs to be increased. In this case, for example, the end part 46 of the spring 40 may be bent in the axial direction (X-axis direction) of the pin body 31 at a part inserted into the first slit 26 so that the width W46 of the end part 46 of the spring 40 in the axial direction (X-axis direction) of the pin body 31 is increased in effect.

Figure 4:
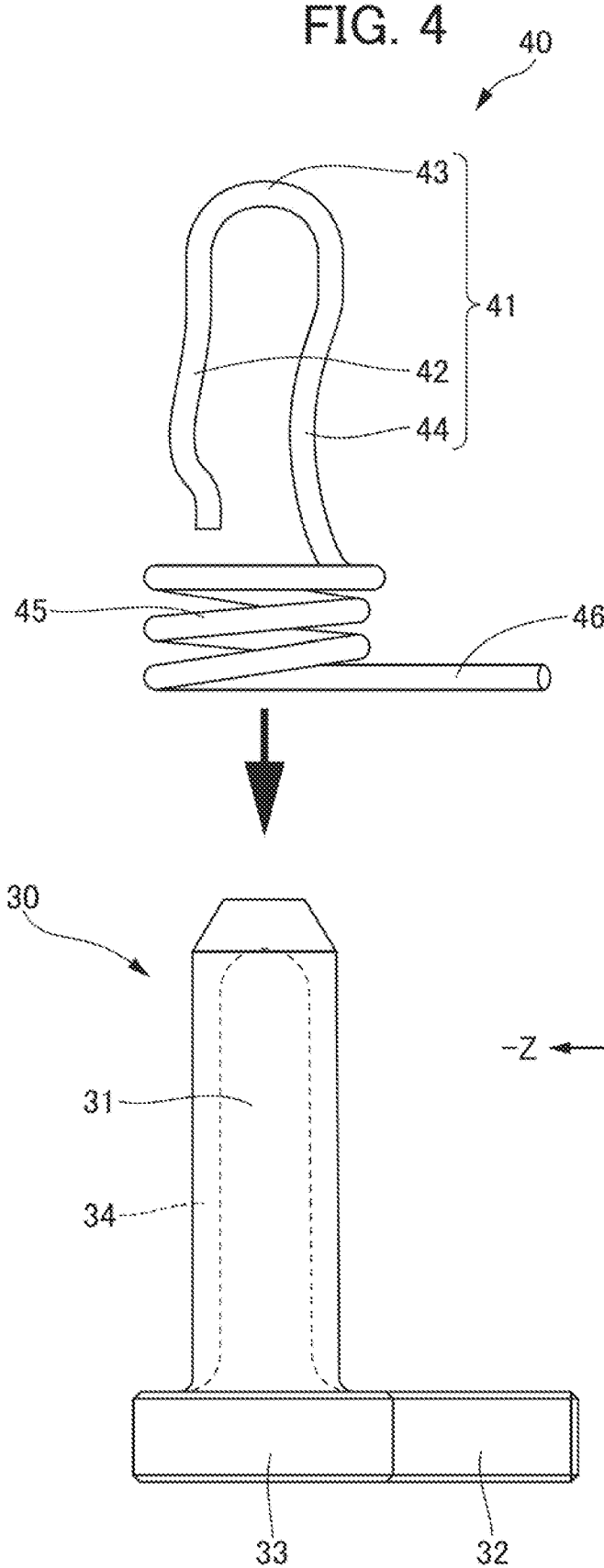
FIG. 4 is a diagram of a pin 30 and a spring 40 when viewed from a +Y side.
Figure 5:
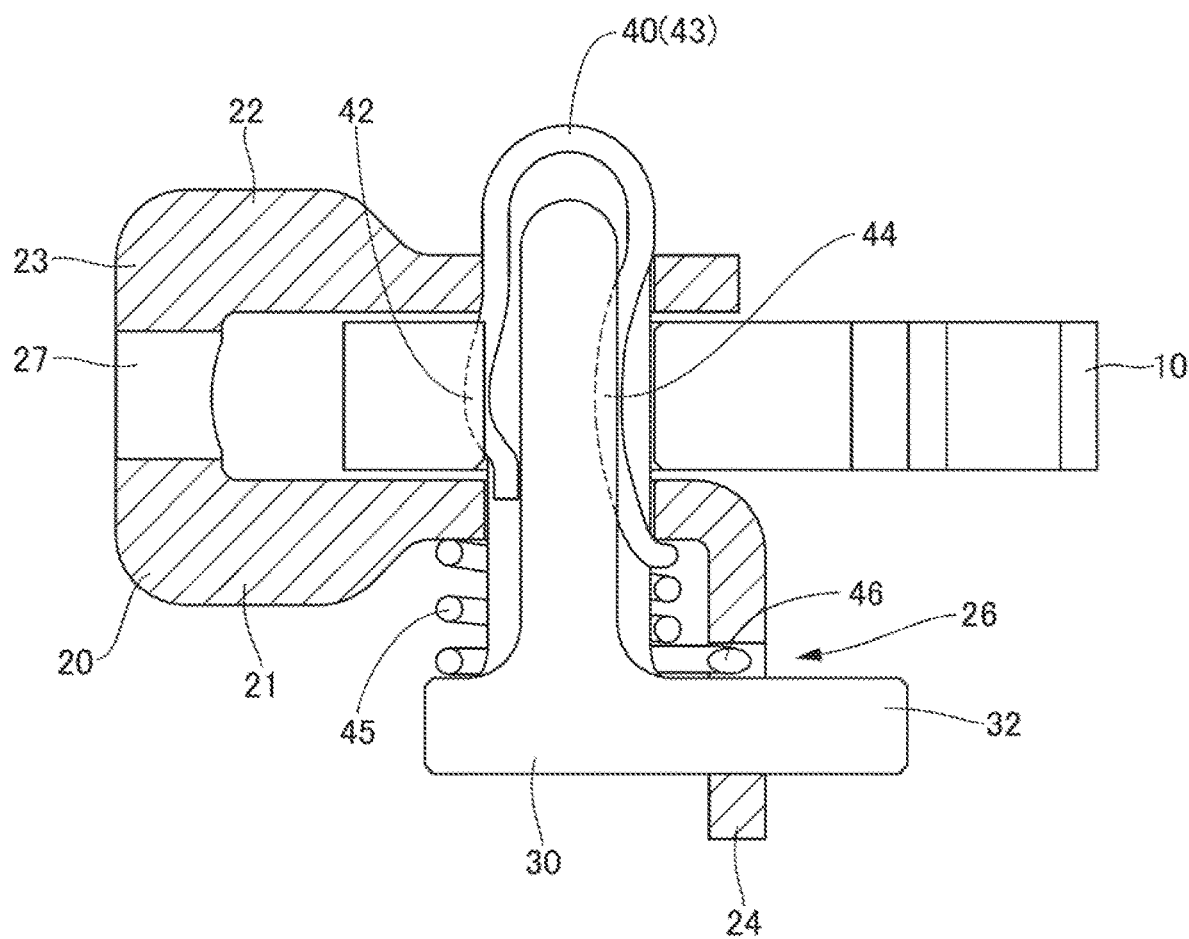
FIG. 5 is a cross-sectional view of the pivot joint structure 1 in an assembled state at the position of arrows A-A in FIG. 1.

FIG. 4 is a diagram of the pin 30 and the spring 40 when viewed from the +Y side. FIG. 5 is a cross-sectional view of the pivot joint structure 1 in the assembled state at the position of arrows A-A in FIG. 1. The pin 30 includes the pin body 31, the protrusion part 32, a flange part 33, and a second slit 34 and is rotatably attached to the fixation member 10. However, since the protrusion part 32 is inserted into the first slit 26 and receives urging force applied by the spring 40, rotation of the pin 30 relative to the fixation member 10 is normally restricted.

The pin body 31 is a rotational shaft that is inserted through the first pin hole 12 and the second pin hole 25. The pin body 31 is formed in a substantially cylindrical shape having an outer diameter with which the pin body 31 can be inserted through the first pin hole 12 and the second pin hole 25. A leading end (leading end on the −X side) of the pin body 31 is chamfered to facilitate insertion into the first pin hole 12 and the second pin hole 25. The pin body 31 is provided with the second slit 34 to be described later.

The protrusion part 32 is provided at one end (end part on the +X side) of the pin body 31 through the flange part 33 and extends from the axis center of the pin body 31 in the first direction (+Z direction) orthogonal to the axial direction (X-axis direction) of the pin body. In the assembly completed state illustrated in FIG. 1, the extending direction of the protrusion part 32 matches the first direction (+Z direction) orthogonal to the axial direction (X-axis direction) of the pin body. At assembly work to be described later, the protrusion part 32 is rotated toward the first slit 26 about a rotation center at the axis center of the pin body 31 and inserted into the first slit 26.

The flange part 33 expands in a flange shape at the one end (end part on the +X side) of the pin body 31. A second wound part 45 of the spring 40 is provided between the flange part 33 and the side surface part 11 of the fixation member 10, and the flange part 33 receives urging force in the +X direction from the second wound part 45.

The second slit 34 extends in the axial direction of the pin body 31. In the assembled state, the second slit 34 is provided at a position opened toward both the −Z side and the +Z side and continuously extends through the leading end (the −X side) of the pin body 31. The second slit 34 is formed in a width with which the spring 40 can be wound.

The spring 40 is disposed along the second slit 34 of the pin 30. The spring 40 includes a first wound part 41, the second wound part 45, and the end part 46.

The first wound part 41 is inserted into the second slit 34 from one end on the protrusion part 32 side of the pin 30 over a leading end part of the pin 30 and wound along the second slit 34. Since the first wound part 41 is provided at the second slit 34 of the pin 30 in this manner, positioning of the spring 40 relative to the pin 30 in the rotational direction can be achieved without additional fabrication such as hole fabrication on the pin 30. Moreover, the pin body 31 has a substantially circular sectional shape (sectional shape orthogonal to the X axis) in a state in which the spring 40 is attached to the pin 30, and thus the first pin hole 12 and the second pin hole 25 do not need to have complicate shapes such as shapes to avoid the spring 40 but may be circular holes. Accordingly, hole fabrication can be easily performed, and since the pin 30 can be inserted at any rotational position in the process of inserting the pin 30, the insertion process can be easily performed.

The first wound part 41 includes a first curved part 42, a leading end bent part 43, and a second curved part 44. The first curved part 42 is provided near an end part opposite to the end part 46 and on the −Z side of the second slit 34 and curved in a convex shape in a direction (−Z direction) opposite to the first direction (+Z direction) in the first pin hole 12 of the fixation member 10 so that the first curved part 42 can come into contact with the fixation member 10.

The leading end bent part 43 is provided at a position corresponding to a leading end (the −X side) of the second slit 34 and connects the first curved part 42 and the second curved part 44.

The second curved part 44 is provided on the −Z side of the second slit 34 and curved in the same direction as the first curved part 42 in the second pin hole 25 of the fixation holder 20 so that the second curved part 44 can come into contact with the fixation holder 20.

Since the first curved part 42 and the second curved part 44 are provided, the first curved part 42 can press the fixation member 10 in the −Z direction, and simultaneously, the second curved part 44 can press the fixation holder 20 in the opposite direction (+Z direction). Thus, it is possible to prevent both backlash between the fixation member 10 and the pin 30 and backlash between the fixation holder 20 and the pin 30.

The second wound part 45 is wound around the outer periphery of the pin body 31 between the planar part 21a of the fixation holder 20 and the protrusion part 32 of the pin 30. The second wound part 45 urges the pin 30 toward a side (the +X side) opposite to the fixation member 10 in the axial direction of the pin body 31 (X direction).

The end part 46 extends substantially in the +Z direction from the second wound part 45 and is inserted into the first slit 26 in the assembled state.

Figure 7:
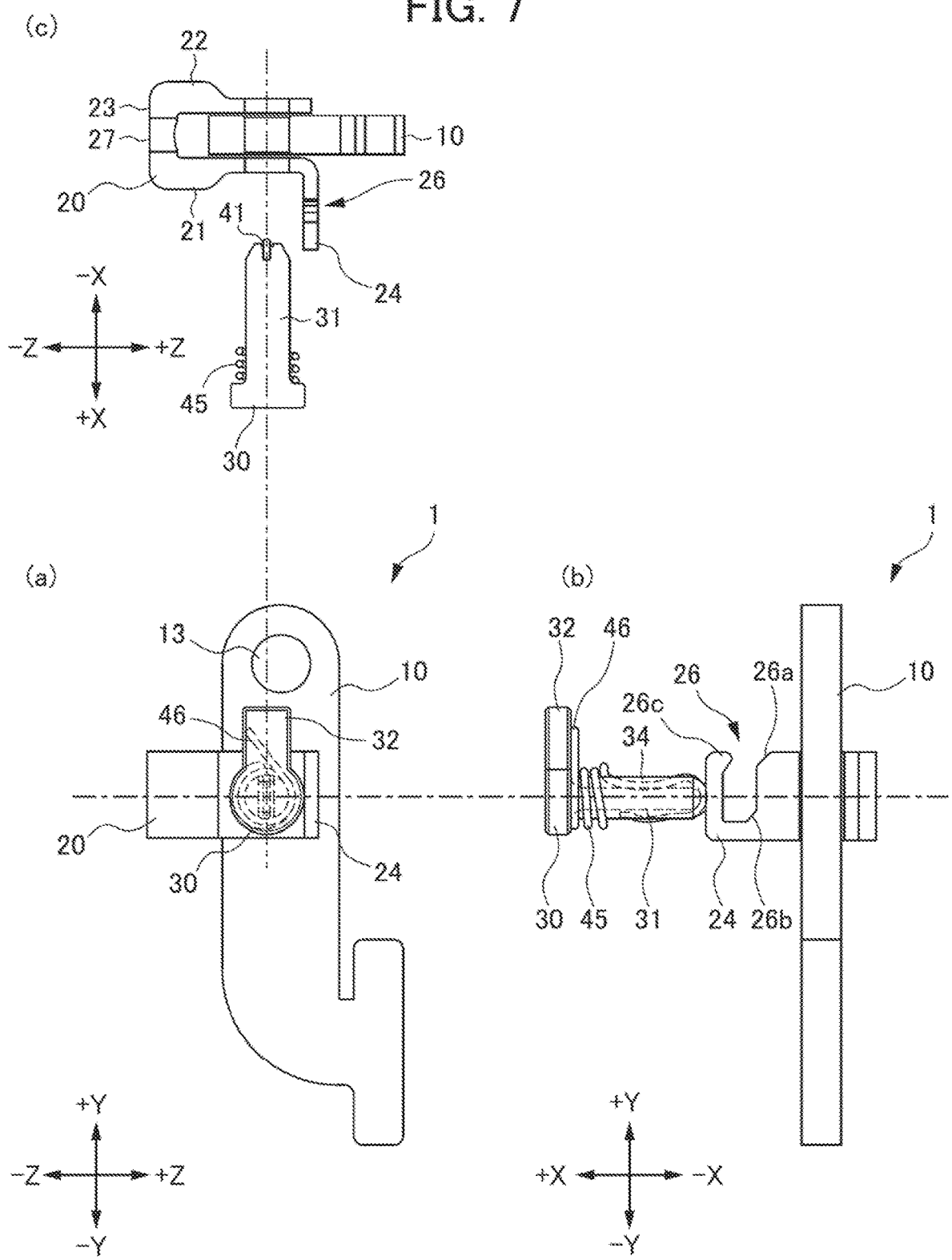
FIG. 7 is a diagram for description of the first work process in respective directions (a), (b) and (c)

The process of assembly work of the pivot joint structure 1 of the present embodiment will be described below. FIG. 6 is a perspective view for description of a first work process. FIG. 7 is a diagram for description of the first work process in respective directions (a), (b) and (c). In FIG. 7, (a) is a diagram when viewed from the +X side, (b) is a diagram when viewed from the +Z side, and (c) is a cross-sectional view at the same position as in FIG. 5. First, in the first work process, the spring 40 is attached to the pin 30 as one unit as illustrated in FIGS. 6 and 7. In addition, the fixation holder 20 is installed at a predetermined position of the fixation member 10 such that the first pin hole 12 and the second pin hole 25 overlap each other.

Figure 8:
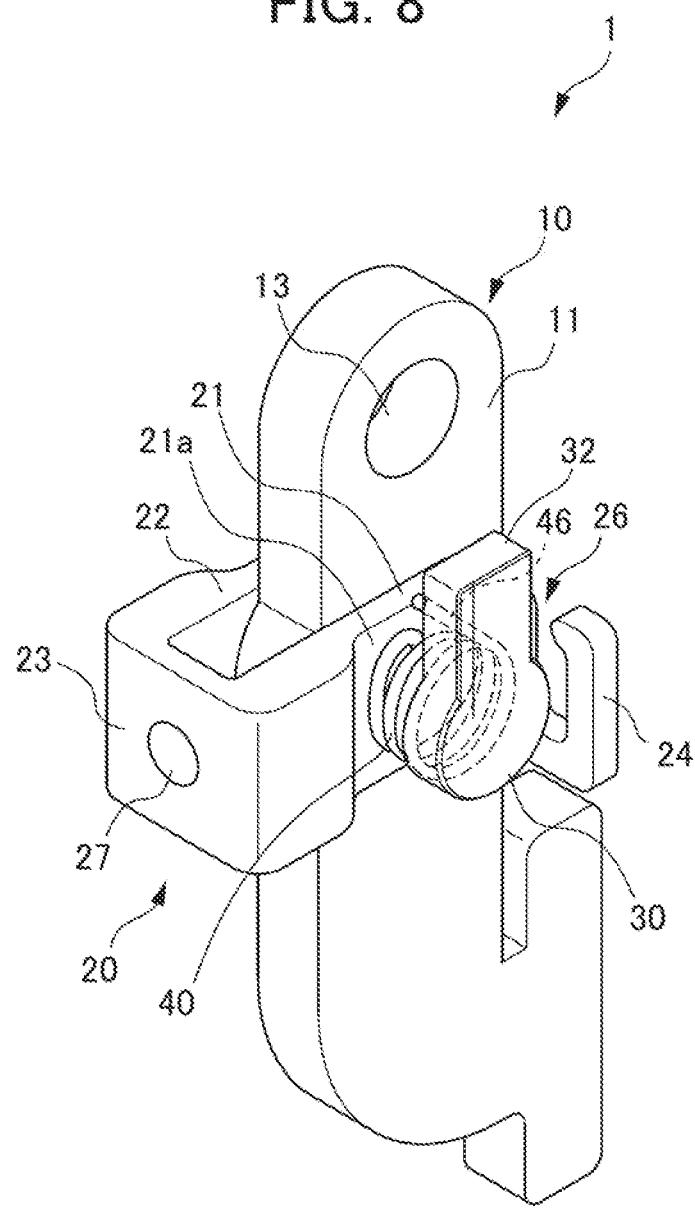
FIG. 8 is a perspective view for description of a second work process.
Figure 9:
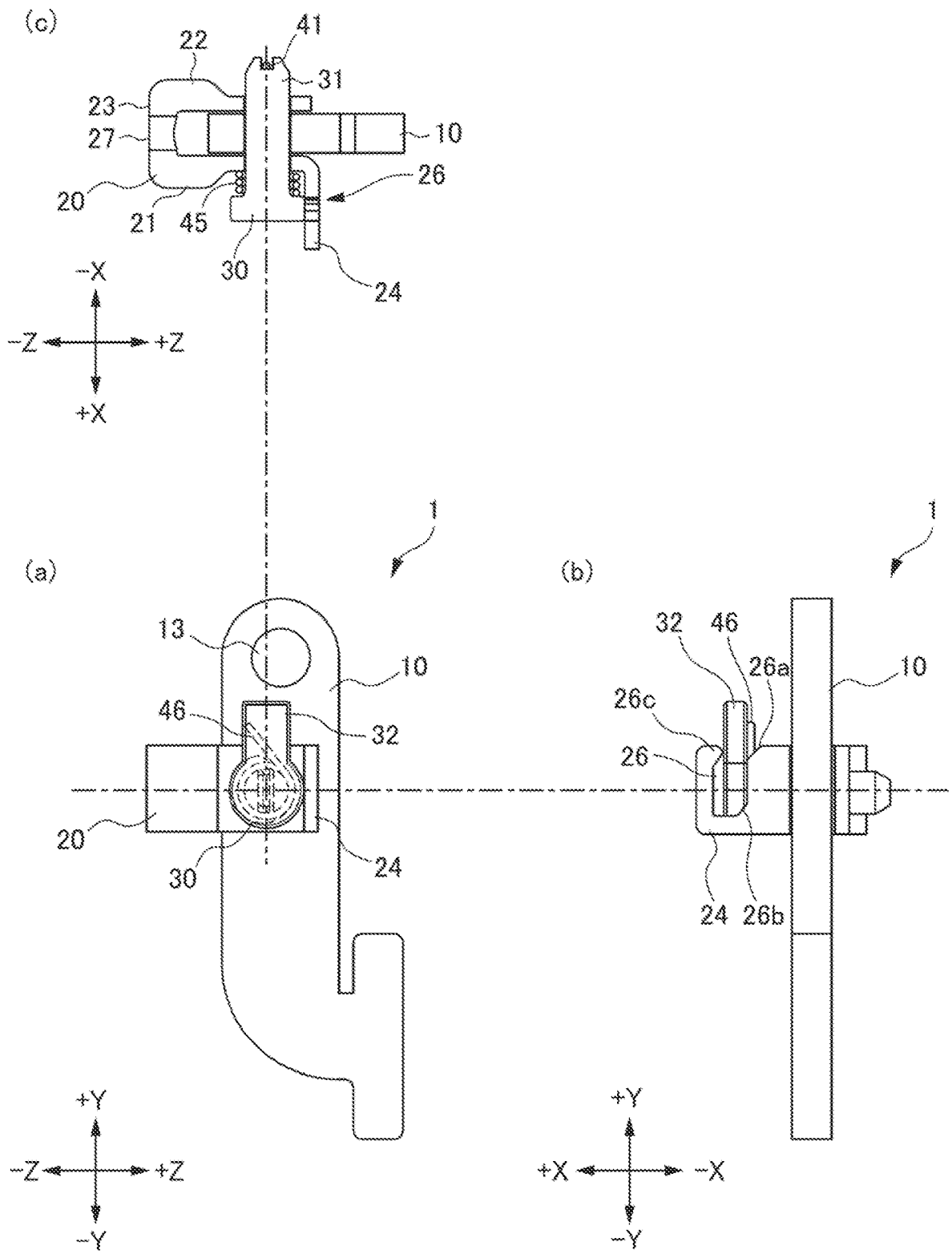
FIG. 9 is a diagram for description of the second work process in respective directions (a), (b) and (c)

FIG. 8 is a perspective view for description of a second work process. FIG. 9 is a diagram for description of the second work process in respective directions (a), (b) and (c). In FIG. 9, (a) is a diagram when viewed from the +X side, (b) is a diagram when viewed from the +Z side, and (c) is a cross-sectional view at the same position as in FIG. 5. In the second work process following the first work process, the combined unit of the pin 30 and the spring 40 is assembled to the fixation member 10 and the fixation holder 20 such that the pin body 31 is inserted into the first pin hole 12 and the second pin hole 25. In this state, the protrusion part 32 of the pin 30 faces toward the +Y side. The insertion is performed up to a position where the second wound part 45 of the spring 40 is sufficiently compressed and cannot further press the pin 30 toward the −X side as illustrated in FIG. 9(c).

Figure 10:
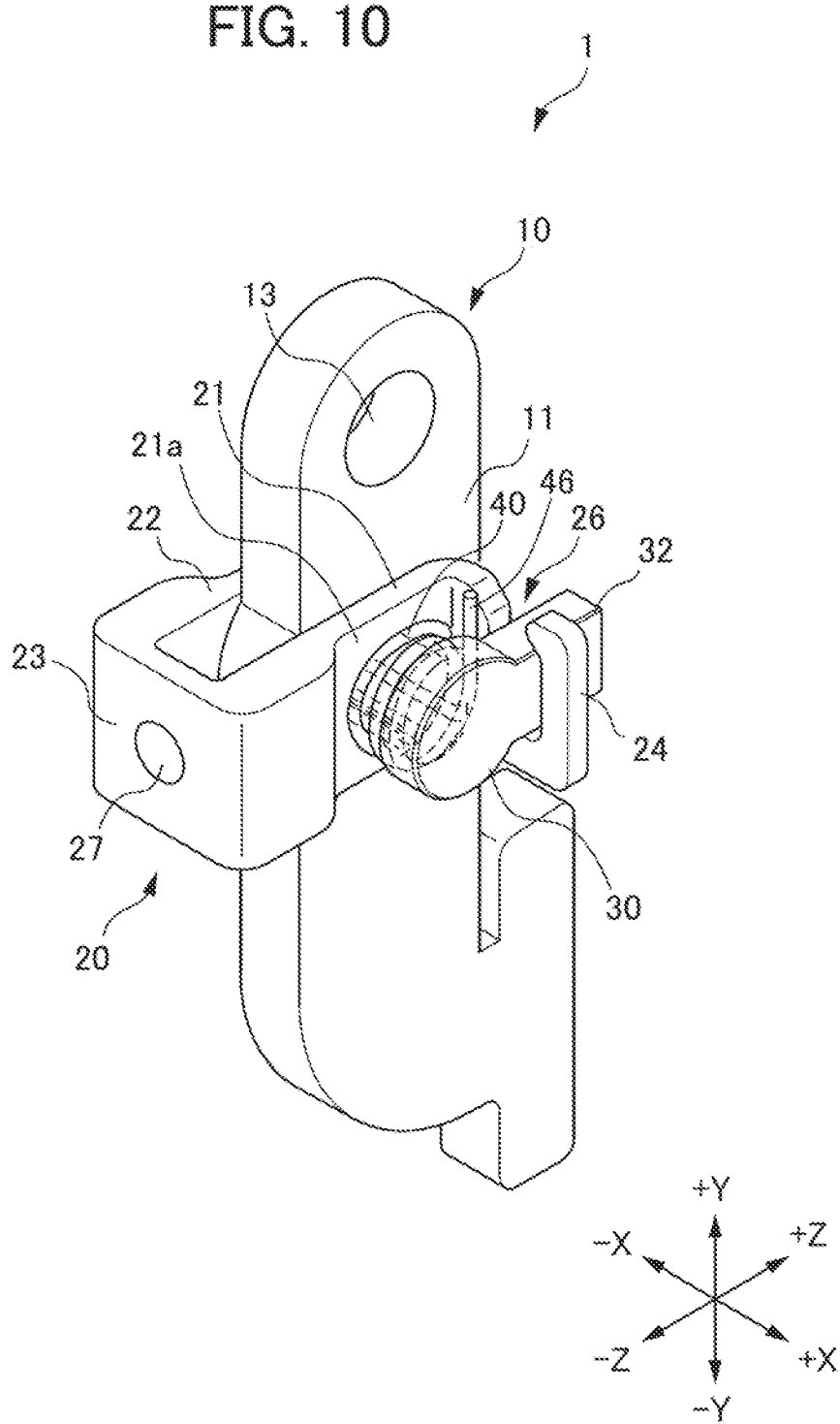
FIG. 10 is a perspective view for description of a third work process.
Figure 11:
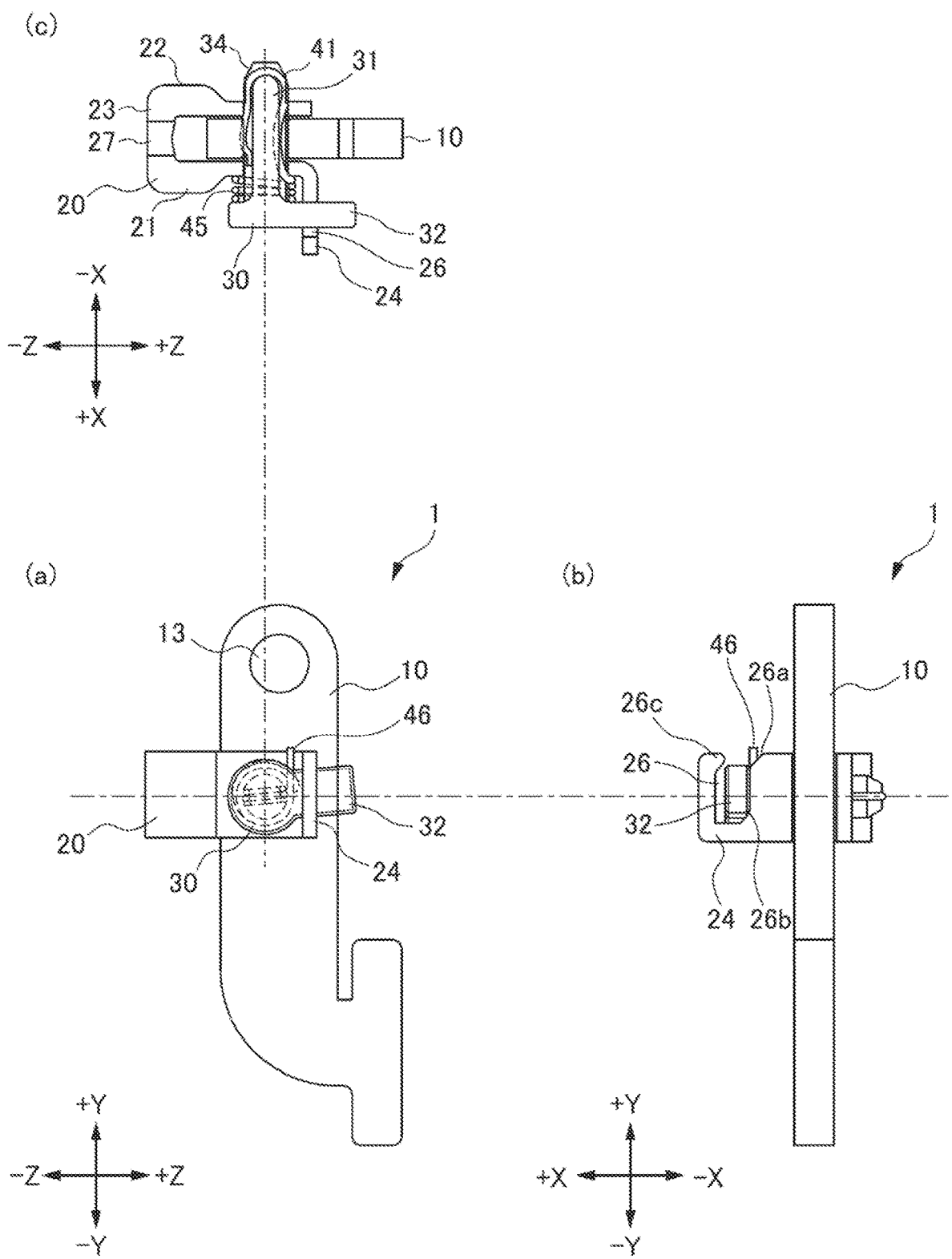
FIG. 11 is a diagram for description of the third work process in respective directions (a), (b) and (c)

FIG. 10 is a perspective view for description of a third work process. FIG. 11 is a diagram for description of the third work process in respective directions. In FIG. 11, (a) is a diagram when viewed from the +X side, (b) is a diagram when viewed from the +Z side, and (c) is a cross-sectional view at the same position as in FIG. 5. In the third work process following the second work process, the pin 30 is rotated by 90° rightward when viewed from the +X side in FIG. 11(a) so that the protrusion part 32 is inserted into the first slit 26. Since the first guide part 26a is provided, work of inserting the protrusion part 32 into the first slit 26 can be easily performed. In this state, the end part 46 of the spring 40 is in contact with the wall part 24 of the fixation holder 20 with its rotation restricted and thus is not inserted into the first slit 26.

Figure 12:
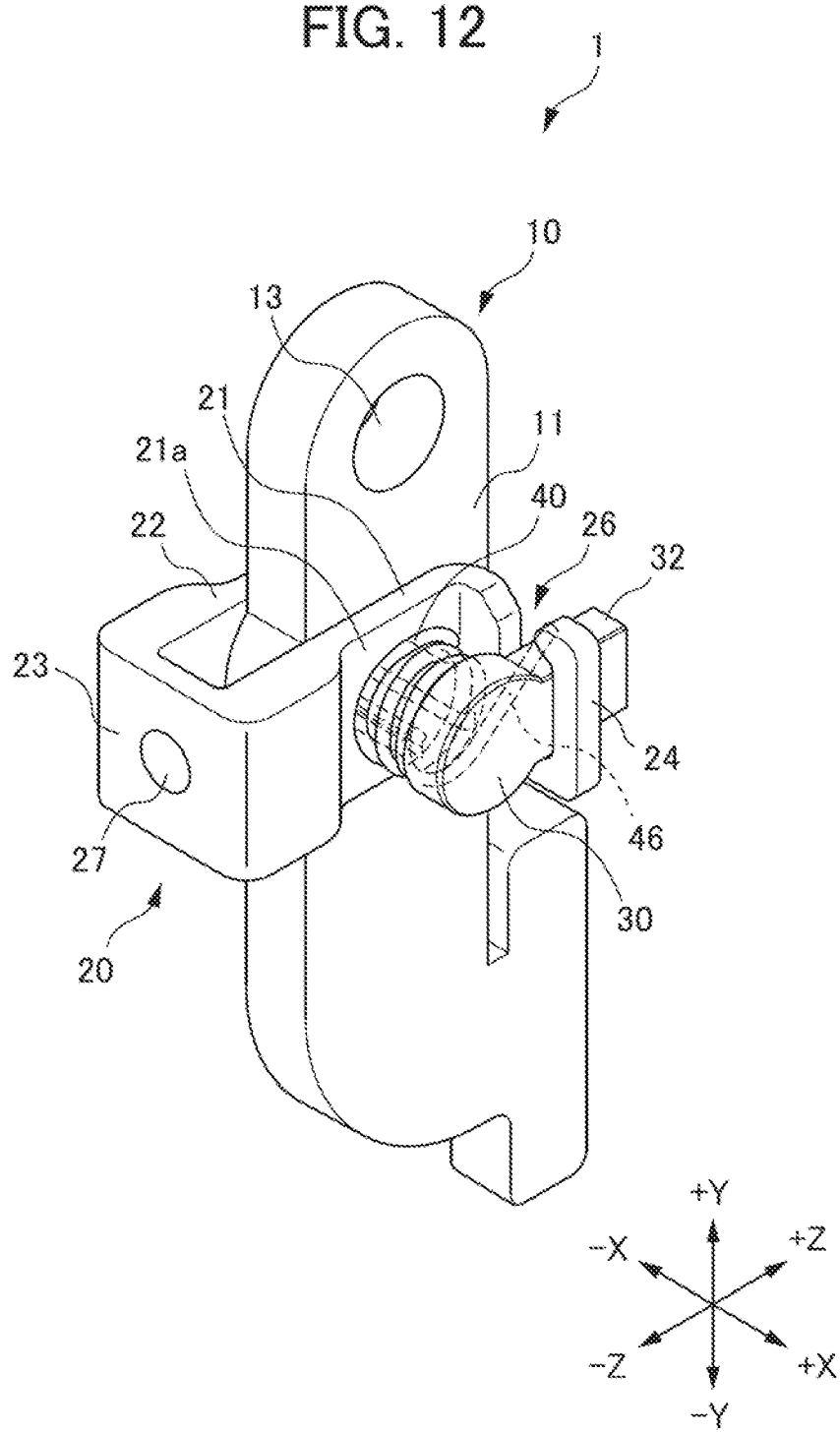
FIG. 12 is a perspective view for description of a fourth work process.
Figure 13:
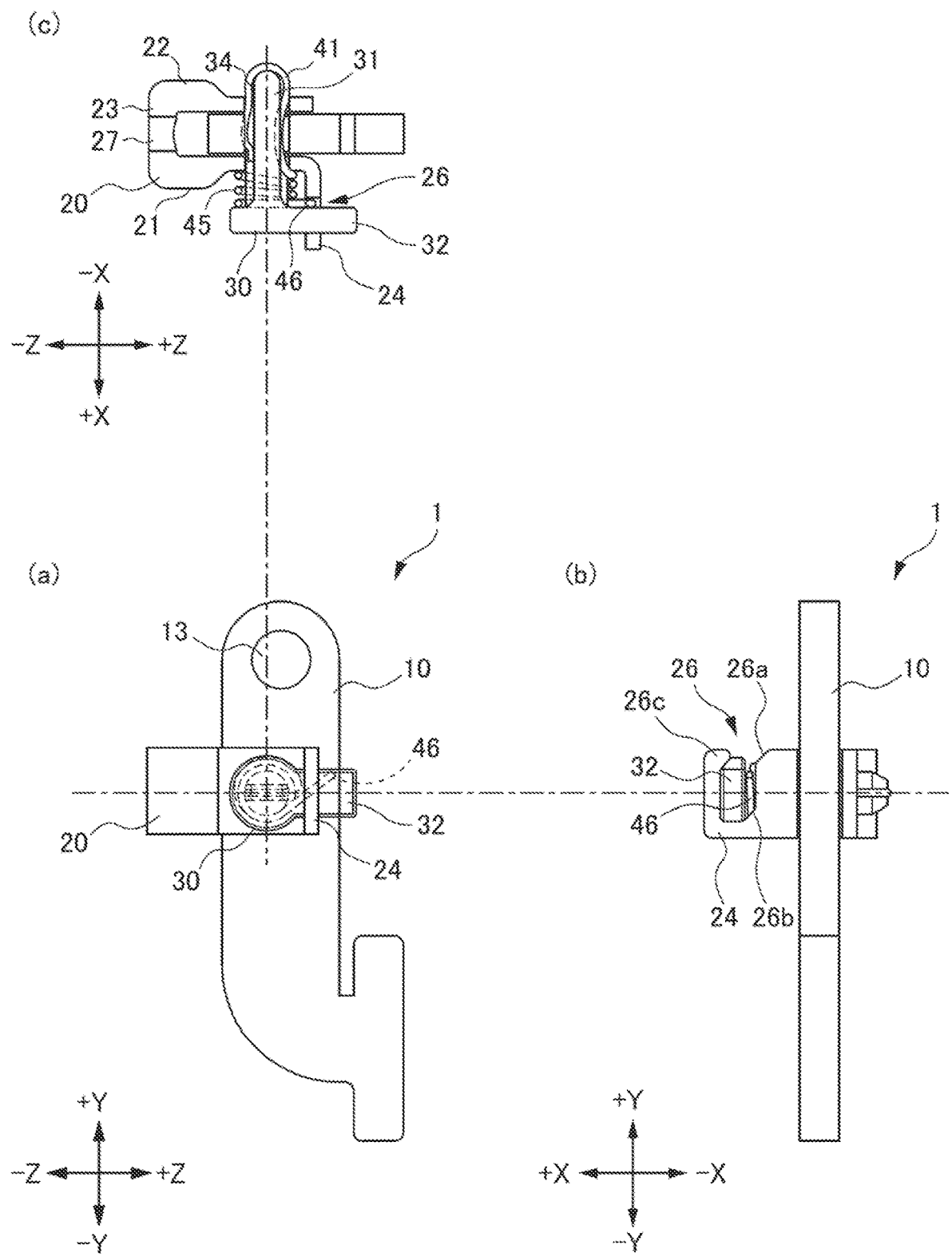
FIG. 13 is a diagram for description of the fourth work process in respective directions (a), (b) and (c).

FIG. 12 is a perspective view for description of a fourth work process. FIG. 13 is diagrams for description of the fourth work process in respective directions. In FIG. 13, (a) is a diagram when viewed from the +X side, (b) is a diagram when viewed from the +Z side, and (c) is a cross-sectional view at the same position as in FIG. 5. In the fourth work process following the third work process, the pin 30 is moved in a removal direction (+X direction) by urging force of the second wound part 45 of the spring 40. In addition, since the protrusion part 32 comes into contact with the second guide part 26b, the pin 30 is further moved in the removal direction (+X direction). As the pin 30 is moved in the removal direction (+X direction), the end part 46 of the spring 40 is moved in the +X direction and the rotation is released from the restriction, and accordingly, the end part 46 of the spring 40 is rotated rightward when viewed from the +X side in FIG. 13(a) due to an effect of returning to a free form. As a result, the end part 46 of the spring 40 is inserted into the first slit 26. Since the first guide part 26a is provided, the first guide part 26a assists insertion of the end part 46 of the spring 40 into the first slit 26.

In this manner, the protrusion part 32 and the end part 46 of the spring 40 are sequentially moved to predetermined positions in the first slit 26 by urging force of the second wound part 45 since the second wound part 45 is provided. Thus, the protrusion part 32 and the end part 46 of the spring 40 can be prevented from being removed from the first slit 26, and also the pin body 31 can be prevented from being removed from the fixation member 10 and the fixation holder 20. Moreover, an effect that the spring 40 presses the pin 30 to a predetermined position in the first slit 26 of the fixation holder 20 is obtained, and accordingly, the accuracy of the pin 30 and the spring 40 in the axial direction can be increased. The above-described fourth work process completes assembly of the pivot joint structure 1.

As described above, according to the pivot joint structure 1 of the present embodiment, backlash of a pivot joint part can be prevented and a loss stroke due to backlash in the entire range of an operation of the fixation member 10 (pedal) from the initial stage to heavy load input can be eliminated, and accordingly, efficiency and operability improve.

With a joint structure using a conventional clevis pin, work of attaching a lock pin has been needed in addition to work of inserting a pin. However, with the pivot joint structure 1 of the present embodiment, assembly work is completed only with a single-hand operation of rotating the pin 30 after inserting the pin 30, and thus operation efficiency can be improved.

Moreover, with the pivot joint structure 1 of the present embodiment, there is no risk such as assembly skipping and failure of a lock pin because no additional lock pin assembly process is needed, and the risk of assembly defect is low because recognizability of assembly completion is high due to a click feeling by the spring, and accordingly, assembly reliability can be increased.

With the pivot joint structure 1 of the present embodiment, the pin is unlikely to come off after assembly completion unless, for example, component deformation or damage occurs in some situations except for intentional disassembly, and thus a joint structure with low risk that the pin comes off and high reliability can be achieved.

With the pivot joint structure 1 of the present embodiment, the position of the pin 30 relative to the fixation holder 20 is fixed by an effect of the spring 40 and the pin 30 is not subjected to positional shift nor abrasion due to actuation, vibration, or the like, and thus functional durability can be enhanced.

With the pivot joint structure 1 of the present embodiment, the number of components does not increase as compared to a joint structure using a conventional clevis pin and the pin 30 can have a shape with which expensive machining fabrication such as hole fabrication is unnecessary, and thus it is possible to inexpensively achieve a configuration with which the above-described effects can be obtained.

Modifications

Various kinds of modifications and changes are possible without limitation to the above-described embodiment and are included in the scope of the present disclosure.

For example, in the above-described example of the embodiment, the pivot joint structure 1 is used at a coupling part between a brake pedal and a brake actuator in an automobile. However, the present invention is not limited thereto, and for example, the pivot joint structure may be used at any other pedal part such as a clutch pedal or an acceleration pedal and may be applied to various joint parts without limitation to a pedal using a clevis.

Moreover, for example, the pivot joint structure 1 of the present disclosure may be used at a clevis joint part of a general-purpose air cylinder, a hydraulic pressure cylinder, or the like used for an industrial facility or the like or may be used at a clevis joint part of a hydraulic pressure cylinder or the like included in a construction machine such as a hydraulic pressure shovel.

The embodiment and modifications may be applied in combination as appropriate, but detailed description thereof is omitted. The present disclosure is not limited by each above-described embodiment.

EXPLANATION OF REFERENCE NUMERALS 1 pivot joint structure
10 fixation member
11 side surface part
12 first pin hole
13 support hole
20 fixation holder
21 facing arm
21a planar part
22 facing arm
23 coupling part
24 wall part
25 second pin hole
26 first slit
26a first guide part
26b second guide part
26c overhang part
27 attachment hole
30 pin
31 pin body
32 protrusion part
33 flange part
34 second slit
40 spring
41 first wound part
42 first curved part
43 leading end bent part
44 second curved part
45 second wound part
46 end part

What is claimed is:

1. A pivot joint structure that couples a fixation member to a fixation holder pivotally supported on the fixation member by a rotational shaft, the pivot joint structure comprising:
a first pin hole provided through the fixation member;
a second pin hole provided through the fixation holder at a position corresponding to the first pin hole; and
a pin including a pin body as the rotational shaft that is inserted through the first pin hole and the second pin hole, wherein
the pin includes a protrusion part provided at one end of the pin body and extending from an axis center of the pin body in a first direction orthogonal to an axial direction of the pin body,
the fixation holder includes a planar part where the second pin hole is provided, and a wall part rising from the planar part in the axial direction of the pin body,
the wall part includes a first slit extending in a second direction orthogonal to the axial direction of the pin body and the first direction and having an opening at one end, and
the protrusion part is inserted into the first slit by being rotated toward the first slit about a rotation center at the axis center of the pin body.

2. The pivot joint structure according to claim 1, further comprising a spring attached to the pin, wherein one end part of the spring and the protrusion part are inserted into the first slit,
the first slit has, at the opening, a slit width in the axial direction of the pin body, and has, at a part closer to a bottom of the first slit than the opening, a slit width in the axial direction of the pin body, and
the slit width at the opening is smaller than the slit width at the part closer to the bottom.

3. The pivot joint structure according to claim 2, wherein the bottom of the first slit includes a second guide part that is sloped and provided on at least one side of the bottom in an axial direction of the pin.

4. The pivot joint structure according to claim 1, wherein one side of the opening of the first slit in the axial direction of the pin body is provided with a first guide part that is sloped toward the other side of the opening of the first slit in the axial direction of the pin body.

5. The pivot joint structure according to claim 4, further comprising a spring attached to the pin, wherein the spring includes a first curved part that is curved in a direction opposite to the first direction and is able to come into contact with the fixation member in the first pin hole of the fixation member, and
a second curved part that is curved in a same direction as the first curved part and is able to come into contact with the fixation holder in the second pin hole of the fixation holder.

6. The pivot joint structure according to claim 1, wherein the pin includes a second slit extending in the axial direction of the pin body,
the pivot joint structure further includes a spring disposed along the second slit, and
the spring includes a first wound part that is wound along the second slit from one end of the pin adjacent to the protrusion part over a leading end part of the pin.

7. The pivot joint structure according to claim 1, further comprising a spring attached to the pin, wherein the spring includes a second wound part that is wound around an outer periphery of the pin body between the planar part of the fixation holder and the protrusion part of the pin and that urges the pin toward a side opposite to the fixation member in the axial direction of the pin body.

* * * * *